US012544114B2

(12) United States Patent
McClintock

(10) Patent No.: US 12,544,114 B2
(45) Date of Patent: Feb. 10, 2026

(54) SEGMENTAL CORRECTION AND SPONDYLOLISTHESIS REDUCTION

(71) Applicant: VB Spine US Opco LLC, Leesburg, VA (US)

(72) Inventor: Larry E. McClintock, Gore, VA (US)

(73) Assignee: VB Spine US Opco LLC, Wilmington, DE (US)

( * ) Notice: Subject to any disclaimer, the term of this patent is extended or adjusted under 35 U.S.C. 154(b) by 285 days.

(21) Appl. No.: 17/923,045

(22) PCT Filed: May 4, 2021

(86) PCT No.: PCT/US2021/030618
§ 371 (c)(1),
(2) Date: Nov. 3, 2022

(87) PCT Pub. No.: WO2021/226057
PCT Pub. Date: Nov. 11, 2021

(65) Prior Publication Data
US 2023/0346433 A1    Nov. 2, 2023

Related U.S. Application Data

(60) Provisional application No. 63/019,681, filed on May 4, 2020.

(51) Int. Cl.
*A61B 17/70* (2006.01)
(52) U.S. Cl.
CPC ...... *A61B 17/7043* (2013.01); *A61B 17/7032* (2013.01); *A61B 17/7077* (2013.01); *A61B 17/7079* (2013.01); *A61B 17/705* (2013.01)

(58) Field of Classification Search
CPC ............ A61B 17/7046; A61B 17/7043; A61B 17/7041; A61B 17/7077; A61B 17/7079; A61B 17/7076
See application file for complete search history.

(56) References Cited

U.S. PATENT DOCUMENTS

| | | | |
|---|---|---|---|
| 5,387,212 A * | 2/1995 | Yuan | A61B 17/701 606/264 |
| 5,437,669 A | 8/1995 | Yuan et al. | |
| 5,741,255 A | 4/1998 | Krag et al. | |
| 6,916,319 B2 | 7/2005 | Munting | |

(Continued)

FOREIGN PATENT DOCUMENTS

| | | | | |
|---|---|---|---|---|
| FR | 2781359 A1 * | 1/2000 | ......... | A61B 17/7043 |
| WO | 9844858 A1 | 10/1998 | | |

OTHER PUBLICATIONS

International Search Report including Written Opinion for Application No. PCT/US2021/030618, dated Aug. 17, 2021, 12 pages.

*Primary Examiner* — Julianna N Harvey
(74) *Attorney, Agent, or Firm* — Lerner David LLP

(57) ABSTRACT

An assembly for correcting spinal deformities may include at least lateral rods extending across adjacent vertebrae to be retained at either end by pedicle screws. A cross-coupler may be coupled to each lateral rod, and a longitudinal rod may run along the spine and be coupled to the lateral rods by the cross-couplers. The assembly may be used to correct spinal deformities by manipulating the pedicle screws or cross-couplers to rotate about the lateral rods or the longitudinal rod.

11 Claims, 12 Drawing Sheets

(56) References Cited

U.S. PATENT DOCUMENTS

| | | | |
|---|---|---|---|
| 7,220,262 B1* | 5/2007 | Hynes | A61B 17/7038 |
| | | | 606/279 |
| 7,294,129 B2 | 11/2007 | Hawkins et al. | |
| 7,670,358 B2 | 3/2010 | Barry | |
| 8,246,665 B2 | 8/2012 | Butler et al. | |
| RE44,392 E | 7/2013 | Hynes | |
| 9,283,001 B2 | 3/2016 | Harper et al. | |
| 9,687,277 B2 | 6/2017 | Wessels et al. | |
| 10,687,860 B2 | 6/2020 | Seex | |
| 2002/0087159 A1 | 7/2002 | Thomas | |
| 2006/0200130 A1* | 9/2006 | Hawkins | A61B 17/7037 |
| | | | 606/279 |
| 2007/0083201 A1 | 4/2007 | Jones et al. | |
| 2008/0021456 A1 | 1/2008 | Gupta et al. | |
| 2008/0097441 A1* | 4/2008 | Hayes | A61B 17/7043 |
| | | | 606/151 |
| 2011/0172714 A1* | 7/2011 | Boachie-Adjei | A61B 17/7076 |
| | | | 606/279 |
| 2012/0197297 A1* | 8/2012 | Bootwala | A61B 17/7077 |
| | | | 606/246 |
| 2013/0238030 A1 | 9/2013 | Steib | |
| 2014/0249584 A1* | 9/2014 | Seex | A61B 17/7043 |
| | | | 606/279 |
| 2021/0212732 A1* | 7/2021 | Assaker | A61B 17/7079 |

* cited by examiner

SEGMENTAL CORRECTION AND SPONDYLOLISTHESIS REDUCTION

CROSS-REFERENCE TO RELATED APPLICATION

The present application is a national phase entry under 35 U.S.C. § 371 of International Application No. PCT/US2021/030618 filed May 4, 2021, published in English, which claims priority from U.S. Provisional Patent Application No. 63/019,681, filed May 4, 2020, all of which is hereby incorporated herein by reference.

BACKGROUND

The spinal column is a highly complex system of bones and connective tissues that provides support for the body and protects the delicate spinal cord and nerves. There are many types of spinal column disorders including scoliosis (abnormal lateral curvature of the spine), kyphosis (abnormal forward curvature of the spine, usually in the thoracic spine), excess lordosis (abnormal backward curvature of the spine, usually in the lumbar spine), spondylolisthesis (forward displacement of one vertebra over another, usually in a lumbar or cervical spine) and other disorders caused by abnormalities, disease or trauma, such as ruptured or slipped discs, degenerative disc disease, fractured vertebra, and the like. Patients that suffer from such conditions usually experience extreme and debilitating pain, as well as diminished nerve function.

A technique commonly referred to as spinal fixation is employed for fusing together and/or mechanically immobilizing vertebrae of the spine. Spinal fixation may also be used to alter the alignment of adjacent vertebrae relative to one another so as to change the overall alignment of the spine. Such techniques have been used effectively to treat the above described conditions and, in most cases, to relieve pain suffered by the patient. Spinal fixation often involves use of polyaxial pedicle screws fixed to the vertebrae to retain rods running along either side of the spine. The rods are typically bent to match an intended post-operative profile for the spine so that reduction of the rods into retaining features of the pedicle screws forcibly realigns the spine to the intended post-operative profile. Because each rod is retained by only one pedicle screw per vertebra, all force applied in reducing a rod at a given location along the spine is typically transferred mostly or entirely to one pedicle. The use of two separate rods on opposite sides of the spine also inhibit certain manual adjustments to individual vertebrae. It may therefore be desirable in certain circumstances to treat spinal deformity with an assembly that better distributes stress across multiple pedicles and allows for manual adjustment of individual vertebrae.

BRIEF SUMMARY

According to an aspect of the disclosure, an assembly for correcting spinal deformities may include at least lateral rods extending across adjacent vertebrae to be retained at either end by pedicle screws. A cross-coupler may be coupled to each lateral rod, and a longitudinal rod may run along the spine and be coupled to the lateral rods by the cross-couplers. The assembly may be used to correct spinal deformities by manipulating the pedicle screws or cross-couplers to rotate about the lateral rods or the longitudinal rod.

For example, a cross-coupler may be rotated about the lateral rod to which it is coupled to cause the longitudinal rod to rotate about that lateral rod, thus realigning the vertebrae to which the correction assembly is connected. A cross-coupler may be rotated about the longitudinal rod to cause the corresponding lateral rod and vertebra to rotate relative to the other lateral rods and vertebrae about the longitudinal rod. A pedicle screw may be rotated about the lateral rod it retains relative to the other pedicle screw retaining the same lateral rod to cause the vertebra into which the pedicle screw is driven to turn about a sagittal axis relative to the correction assembly.

In another aspect, a cross-coupler may include a housing with two apertures on opposite sides of the housing such that a lateral rod may pass through both apertures, and a U-shaped channel provided by two slots on opposite sides of an interior space of the housing such that a longitudinal rod is insertable into the slots and interior space of the housing.

In some arrangements, the housing may be slidable along the lateral rod while the lateral rod extends through both apertures.

In some arrangements, both apertures may have a closed perimeter.

In some arrangements, the housing may include an upper opening into the interior space of the cross-coupler, the upper opening extending to connect the slots.

In some arrangements, the housing may include internal threading facing toward the interior space and located near the upper opening, and a set screw threadingly engageable with the internal threading.

In some arrangements, a spinal correction assembly may include the cross-coupler and a lateral rod extending through both apertures and a longitudinal rod disposed through the slot under the set screw.

In some arrangements, the lateral rod and longitudinal rod may be simultaneously lockable in place within the housing of the cross-coupler by advancement of the set screw.

In some arrangements, the cross-coupler may include a lower insert disposed within the internal space of the housing between the lateral rod and a bottom of the housing.

In some arrangements, the lower insert may include resilient tabs engaged with notches in an inner surface of the housing.

In some arrangements, the cross-coupler may include an upper insert disposed within the internal space of the housing between the lateral rod and the longitudinal rod.

In some arrangements, the upper insert may include resilient tabs engaged with notches in an inner surface of the housing.

In another aspect, a method of treating a spinal deformity may include driving a pedicle screw into each pedicle of at least two adjacent vertebrae, retaining lateral rods within retaining features of the pedicle screws, each lateral rod having a cross coupler positioned thereon, such that each lateral rod and cross coupler is fastened to one of the vertebrae by a pair of pedicle screws, and placing a longitudinal rod through each cross-coupler on cross-coupler on each of the lateral rods. The method may further include, after the longitudinal rod is retained within the cross-couplers, rotating either the cross-coupler fastened to a selected vertebra or a first of the pedicle screws driven into the selected vertebra about the lateral rod fastened to the selected vertebra.

In some arrangements, the method may include comprising treatment of a sagittal spondylolisthesis by rotating the cross-coupler fastened to the selected vertebra about the lateral rod fastened to the selected vertebra.

In some arrangements, rotating the cross-coupler fastened to the selected vertebra may rotate the longitudinal rod, thereby moving another vertebra relative to the selected vertebra in either an anterior or posterior direction.

In some arrangements, a cross-coupler set screw may be in a loosened state while the cross-coupler is rotated relative to the lateral rod, and the method may include tightening the cross-coupler set screw against the longitudinal rod after the cross-coupler is rotated relative to the lateral rod.

In some arrangements, the method may include rotating the first of the pedicle screws driven into the selected vertebra about the lateral rod fastened to the selected vertebra relative to a second of the pedicle screws driven into the selected vertebra.

In some arrangements, a pedicle screw set screw may be in a loosened state within the first of the pedicle screws during rotation of the first of the pedicle screws. The method may include tightening the pedicle screw set screw within the first of the pedicle screws against the lateral rod fastened to the selected vertebra after the first of the pedicle screws is rotated about the lateral rod.

In some arrangements, the method may include rotating the second of the pedicle screws driven into the selected vertebra in an opposite direction about the lateral rod fastened to the selected vertebra from the first of the pedicle screws driven into the selected vertebra.

In some arrangements, a pedicle set screw may be loose within each of the first and second pedicle screws driven into the selected vertebra during rotation of the first and second pedicle screws. The method may include tightening the pedicle screw set screws within the first and second pedicle screws against the lateral rod fastened to the selected vertebra after the first and second pedicle screws are rotated about the lateral rod.

In some arrangements, the method may include wrapping a first strap around a portion of the lateral rod fastened to the selected vertebra, coupling a first implant housing to a lateral rod fastened to a first vertebra other than the selected vertebra, and rotating the selected vertebra by tightening the first strap through the first implant housing.

In some arrangements, the method may include wrapping a second strap around a portion of the lateral rod fastened to the selected vertebra, coupling a second implant housing to a lateral rod fastened to a second vertebra other than the selected vertebra and on an opposite side of the selected vertebra from the first vertebra; and rotating the selected vertebra by tightening the second strap through the second implant housing.

In some arrangements, the method may include positioning two cross-couplers onto each lateral rod before retaining the lateral rods in the pedicle screws, and disposing a second longitudinal rod along the spine such that the second longitudinal rod extends through a cross-coupler on each of the lateral rods.

In some arrangements, the method may include rotating the cross-coupler fastened to the selected vertebra about the longitudinal rod after the longitudinal rod is retained within the cross-couplers.

In some arrangements, rotating either the cross-coupler fastened to the selected vertebra or the first of the pedicle screws driven into the selected vertebra about the lateral rod fastened to the selected vertebra may include engaging a distal end of a manipulator to either the cross-coupler fastened to the selected vertebra or a head of the first of the pedicle screws driven into the selected vertebra, and applying a force to a proximal end of the manipulator that is transverse to a proximal-distal axis of the manipulator.

In another aspect, a method of correcting a spinal deformity may include driving a pedicle screw into each pedicle of at least two adjacent vertebrae, retaining lateral rods within retaining features of the pedicle screws, each lateral rod having a cross coupler positioned thereon, such that each lateral rod and cross coupler is fastened to one of the vertebrae by the pedicle screws, disposing a longitudinal rod along the spine such that the longitudinal rod extends through a cross-coupler on each of the lateral rods, and after the longitudinal rod is retained within the cross-couplers, rotating the cross-coupler fastened to a selected vertebra about the longitudinal rod.

In some arrangements, the method may include wrapping a first strap around a portion of the lateral rod fastened to the selected vertebra, coupling a first implant housing to a lateral rod fastened to a first vertebra other than the selected vertebra, and rotating the selected vertebra by tightening the first strap through the first implant housing.

In some arrangements, the method may include wrapping a second strap around a portion of the lateral rod fastened to the selected vertebra, coupling a second implant housing to a lateral rod fastened to a second vertebra other than the selected vertebra and on an opposite side of the selected vertebra from the first vertebra, and rotating the selected vertebra by tightening the second strap through the second implant housing.

In some arrangements, the method may include wrapping a second strap around the portion of the lateral rod fastened to the selected vertebra adjacent to the first strap, coupling a second implant housing to the lateral rod fastened to the first vertebra other than the selected vertebra adjacent to the first implant housing, and rotating the selected vertebra by tightening the second strap through the second implant housing.

DETAILED DESCRIPTION

When referring to specific directions and planes in the following disclosure, it should be understood that, as used herein, the term "proximal" means closer to the operator/surgeon, and the term "distal" means further away from the operator/surgeon.

Figure 1:
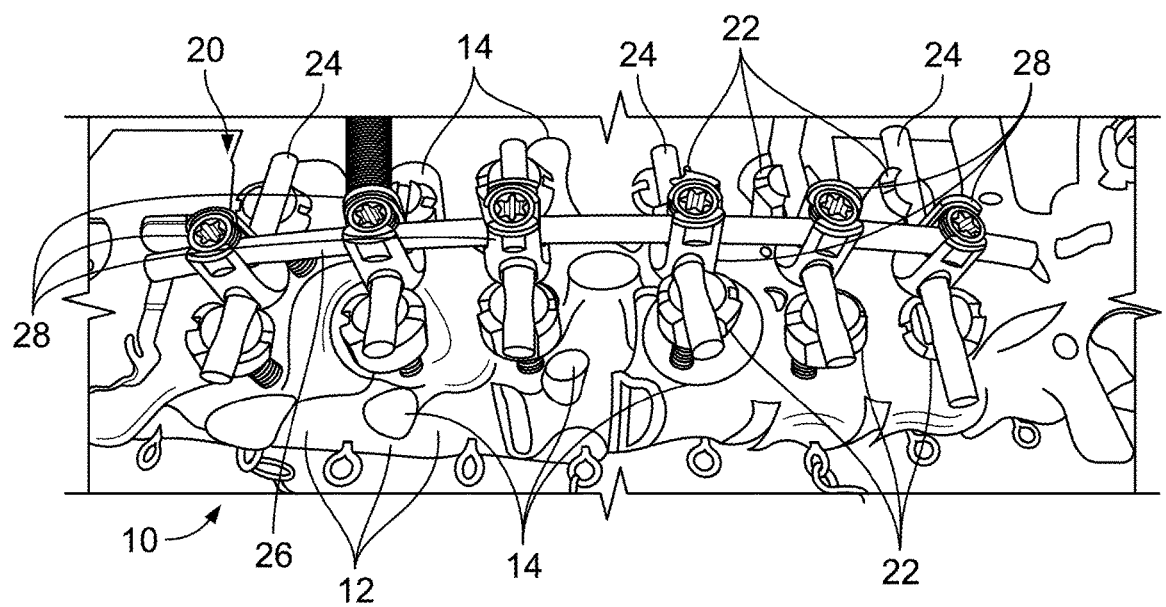
FIG. 1 is a perspective view of a spinal correction assembly according to a first arrangement.

A model portion of a human spine 10 with a correction assembly 20 extending along a dorsal side thereof is illustrated in FIG. 1. The correction assembly 20 serves to correct misalignment of vertebrae 12 of the spine 10 by action upon pedicles 14 of the vertebrae 12. The correction assembly 20 is anchored to the spine 10 by pedicle screws 22 driven into the two pedicles 14 of each vertebra 12 on which the correction assembly 20 acts.

The pedicle screws 22 may be similar to any of a broad variety of known pedicle screws used in spinal rod-reduction procedures. Such screws typically have a threaded shank for threadingly engaging the pedicle 14 bone and a coupling member, also known as a cage or a tulip, for retaining a rod. Additional details regarding an exemplary suitable screw may be found in U.S. Pat. No. 6,537,276, filed May 1, 2001, the entirety of which is incorporated herein by reference. The tulip of each pedicle screw 22 may be pivotable or immovable relative to the shank of the pedicle screw 22 in various arrangements. In some exemplary arrangements, the tulip of each pedicle screw 22 includes internal threading for engagement with a set screw to retain the lateral rod 24 within the tulip. In further exemplary arrangements, the tulip of each pedicle screw 22 includes an inner housing formed to act as a collet around the lateral rod 24, and an outer housing moveable relative to the inner housing to cause the inner housing to selectively release or retain the lateral rod 24. Additional details regarding exemplary collet or taper lock screw and rod systems may be found in U.S. Pat. No. 7,988,694, filed Jul. 27, 2006, and U.S. Pat. No. 8,814,919, filed Oct. 22, 2008, the entirety of which are hereby incorporated by reference. Set screw and taper lock screws are only two examples of suitable rod retention features, and it should be understood that the apparatuses and methods described below can be used with any other functionally similar devices for retaining correction rods.

Each pair of pedicle screws 22 fixed with a single vertebra 12 holds a lateral rod 24. Each lateral rod 24 extends laterally across a respective vertebra 12 and is retained at either end by a pedicle screw 22. A longitudinal rod 26 extends across the lateral rods 24, and is coupled to the lateral rods 24 by a cross-coupler 28 on each lateral rod 24. The longitudinal rod 26 is shaped to facilitate manipulation of the spine 10 to an intended post-treatment contour. Force or tension between the longitudinal rod 26 and each vertebra 12 is distributed across both pedicles 14 of the vertebra 12. By acting simultaneously on both pedicles 14 of each vertebra 12 throughout manipulation or reduction of the longitudinal rod 26, the correction assembly 20 reduces the rate at which stress is applied to any one pedicle 14 individually. As such, the illustrated correction assembly 20 can enable certain procedures to be performed more quickly than in some known assemblies with longitudinal rods running along either side of the spine, each connected to only one pedicle 14 per vertebra 12. Further, the correction assembly 20 facilitates certain manipulations that would be difficult or impossible to accomplish in systems that constrain the vertebrae 12 with two parallel longitudinal rods 26. For example, the correction assembly 20 enables each vertebra 12 to be rotated about the longitudinal rod 26 on a transverse plane or rotated about an anterior-posterior axis.

Though the correction assembly illustrated in FIG. 1 extends across six vertebrae 12, correction assemblies 20 according to various arrangements can be of differing lengths as appropriate for specific procedures. Specifically, correction assemblies 20 according to various arrangements may be of any length sufficient to connect to at least two vertebrae 12.

Figure 2A:
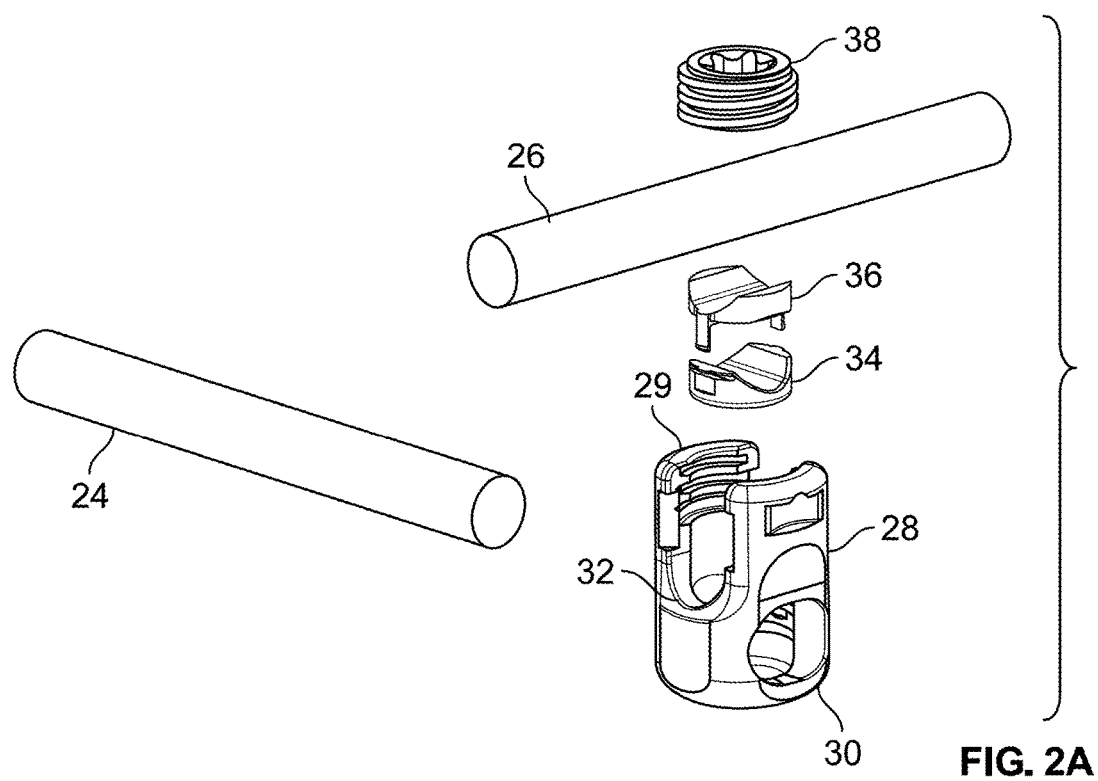
FIG. 2A is an exploded view of a portion of the correction assembly of FIG. 1.

An exploded portion of the correction assembly 20 is illustrated in FIG. 2A. The cross-coupler 28 includes apertures 30 (with only one aperture 30 being visible from the perspective of FIG. 2A) for receiving the lateral rod 24 and two slots 32 (with only one slot 32 being visible from the perspective of FIG. 2A). The two slots 32 are on opposite sides of an interior space 31 (shown in FIG. 2B) of the cross-coupler, and thereby provide a U-shaped channel for receiving the longitudinal rod 26. The apertures 30 have closed perimeters, which are round in shape, in the arrangement illustrated in FIG. 2A. Because the apertures 30 have closed perimeters, the apertures 30 do not connect to the slots 32 or an upper or lower edge of the cross-coupler 28. The lateral rod 24 can therefore only be disposed through the cross-coupler by passing an end of the lateral rod 24 into an aperture 30 then through the cross-coupler 28 and out of the opposite aperture 30. As such, each cross-coupler 28 must be slid onto the corresponding lateral rod 24 before that lateral rod 24 is connected to pedicle screws 22 at both ends. In contrast, the slots 32 are connected by a top opening 29 in the cross-coupler 28. The longitudinal rod 26 may therefore be disposed through the slots 32 by sliding the longitudinal rod 26 end-first through the slots 32 in a manner similar to that described above with regard to the lateral rod 24 and apertures 30 or by dropping the longitudinal rod 26 through the top opening 29 so that it lays through the slots 32.

Figure 2B:
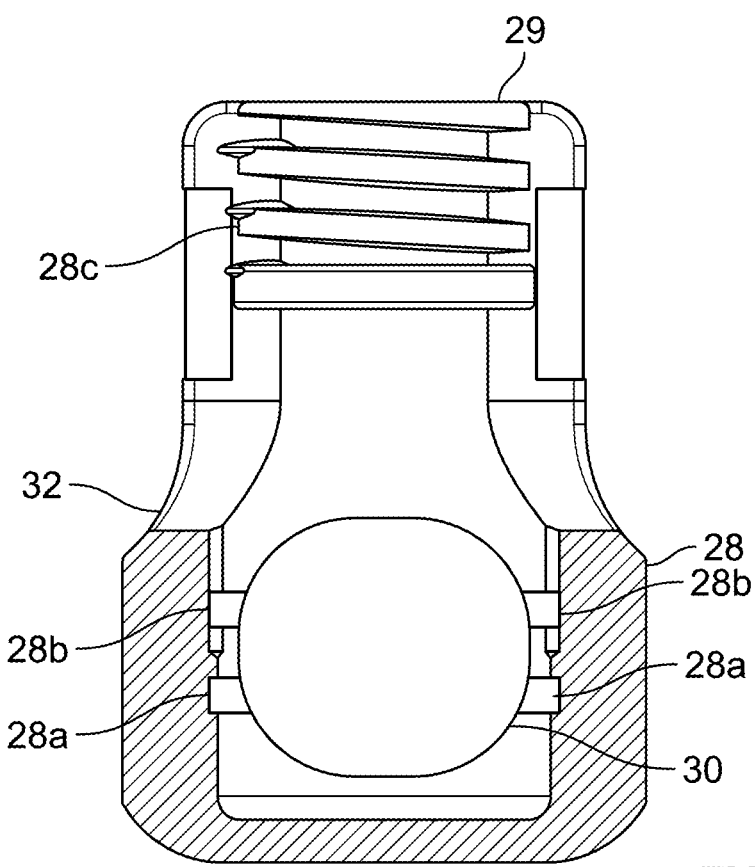
FIG. 2B is a cross-sectional elevation view of a component of the correction assembly of FIG. 1.
Figure 2C:
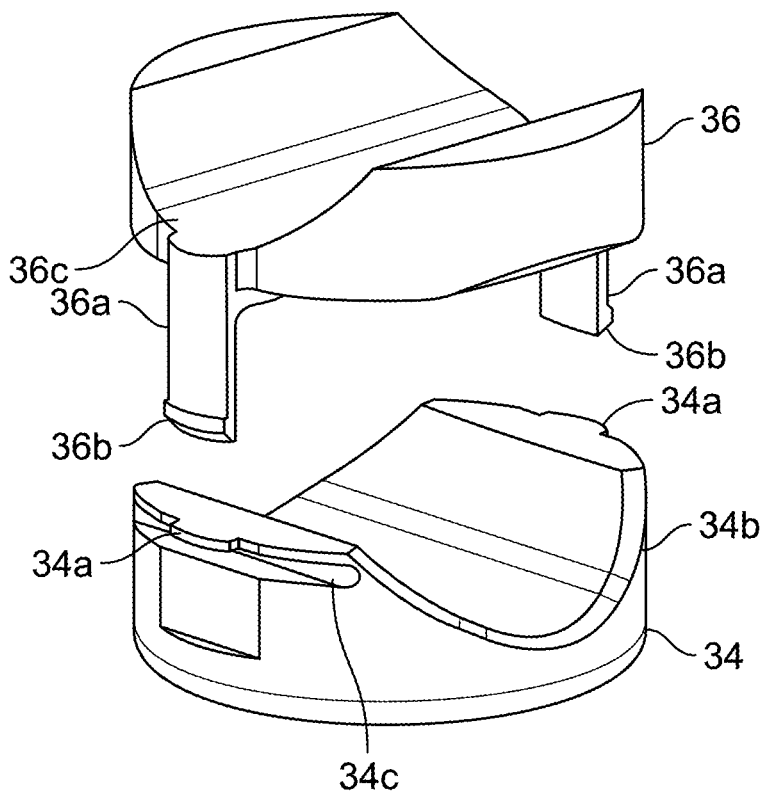
FIG. 2C is a perspective view of two components of the correction assembly of FIG. 1.
Figure 2D:
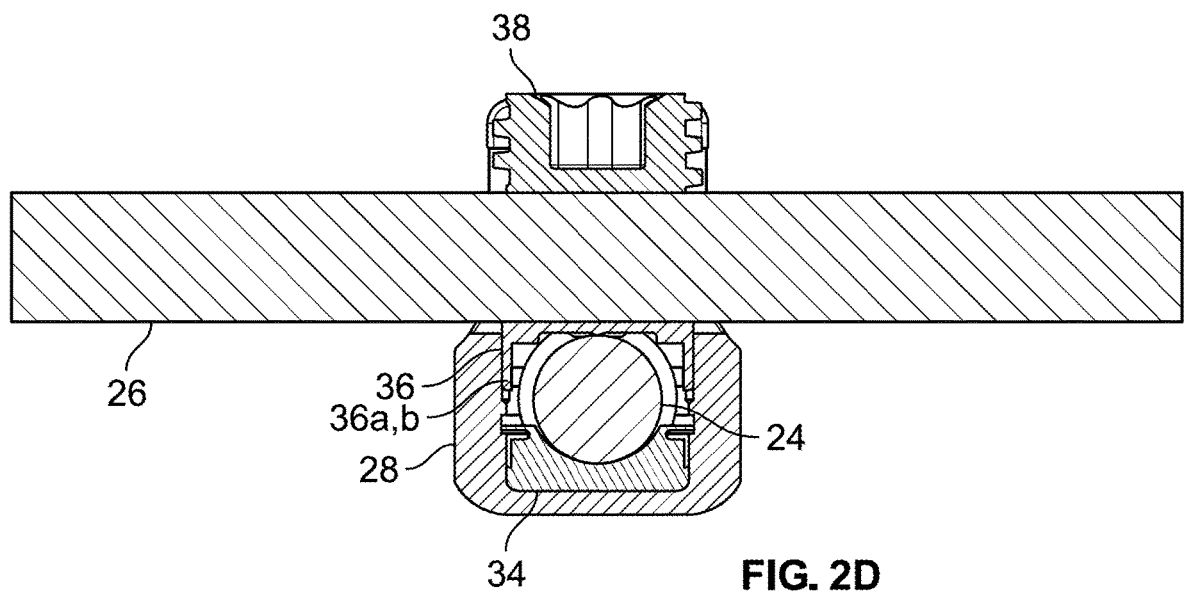
FIG. 2D is a cross-sectional elevation view of the portion of the correction assembly shown in FIG. 2A.

Turning to FIGS. 2B-2D, with continued reference to FIG. 2A, a lower insert 34 is provided to sit at a bottom of the interior space 31 of the cross-coupler 28, below the lateral rod 24, and an upper insert is provided to sit in the interior space 31 between the lateral rod 24 and the longitudinal rod 26. The lower insert 34 includes a first pair of tabs 34a for clipping the lower insert 34 into lower notches 28a within the cross-coupler 28. The tabs 34a may be cantilevered in the radial direction by defining a slot 34c below them such that the tabs 34a are somewhat flexible in a direction along the longitudinal axis 34c of the cross-coupler 28. The lower insert 34 also includes a first groove 34b for the lateral rod 24 to lie within. The lower insert 34 and the notches 28a may be designed such that insertion of the lateral rod 24 within the first groove 34b pushes the lower insert 34 slightly downwardly. As a result, the tabs 34a received within the notches 28a may deflect slightly such that a biasing force towards the neutral position creates an increased friction force between the lower insert 34 and the lateral rod 24. Beneficially, that increased friction may make the position and/or orientation of the cross-coupler 28 more stable along the lateral rod 24, so that the cross-coupler 28 does not readily spin or slide along the lateral rod 24 out of a desired position set by a surgeon before the components have been locked down. The upper insert 36 includes a pair of arms 36a ending in a second pair of tabs 36b for clipping the upper insert 36 into upper notches 28b within the cross-coupler 28. The upper insert 36 also includes a second groove 36c for the longitudinal rod 26 to lie within. Both the first and second pair of tabs 34a, 36b are resiliently formed on their respective insert 34, 36 such that the tabs 34a, 36b can deflect during insertion of the insert 34, 36, then snap into place in the respective notches 28a, 28b when the insert 34, 36 is properly aligned.

The cross-coupler 28 includes two threaded interior surfaces 28c (with only one of the threaded interior surfaces 28c visible from the perspectives of FIGS. 2A-2D) between the slots 32 and near the upper opening 29. A set screw 38 is threadingly engageable with the threaded interior surfaces 28c to retain the longitudinal rod 26 within the slots 32.

In a process for assembling the illustrated correction assembly 20, a pedicle screw 22 is driven into each of the two pedicles 14 of each vertebra 12 to be connected to the longitudinal rod 26. For each vertebra 12 to be connected to the longitudinal rod 26, a lower insert 34 is dropped into the interior space 31 of a cross-coupler 28 such that the first pair of tabs 34a clips into the lower notches 28a, a longitudinal rod 24 is inserted through both apertures 30 of the cross-coupler 28 to lie in the first groove 34b, and a second insert 36 is dropped into the interior space 31 of the cross-coupler 28 such that the arms 36a extend past opposite sides of the lateral rod 24 and the second pair of tabs 28b clips into the upper notches 28a. The lateral rods 24 are then each coupled at either end to the two pedicle screws 22 driven into opposite pedicles 14 of one of the vertebrae 12, thereby securing each lateral rod 24 and cross-coupler 28 to a different vertebra 12 via the pedicle screws 22. Depending on the manipulation to be performed (as discussed in more detail below), the lateral rods 24 may not initially be fully locked with respect to the pedicle screws 22 (e.g., the set screws may not be tightly advanced against the lateral rods 24), so that the lateral rods 24 may at least be able to rotate about their respective longitudinal axes during the subsequent vertebral manipulations. The cross-couplers 28 positioned on any or all of the lateral rods 24 may also be slid along the respective lateral rod 24 to a desired position in the medial-lateral direction. The longitudinal rod 26 is then reduced, such as by a known rod reduction process and device, or by a process or device similar thereto, into the slots 32 of the cross-couplers 28 and the second grooves 36c of the upper inserts 36. Set screws 38 are threaded into the threaded interior surfaces 28c of each cross-coupler 28 to retain the longitudinal rod 26. Depending on the manipulation to be performed (as discussed in more detail below), the longitudinal rod may not initially be fully locked with respect to the any or all of the cross-couplers 28 (i.e., the set screws 38 may not be tightly advanced against the longitudinal rods 26), so that the cross-couplers 28 may at least be able to rotate about the longitudinal axis of the longitudinal rod 26 during the subsequent vertebral manipulations. Subsequently, the set screws 38 may then be tightly advanced to lock the cross-couplers 28. For example, fully advancing the set screw 38 into the respective cross-coupler 28 may push the longitudinal rod 26 distally, which may in turn push the second insert 36 distally against the lateral rod 24, which may in turn push the lower insert 34 distally against the interior bottom surface of the cross-coupler and/or press the lateral rod 24 distally against the distal surfaces of the apertures 30. Thus, fully tightening the set screw 38 into the respective cross-coupler 28 will preferably lock the longitudinal positions and/or the rotational orientations of both the lateral rod 24 and the longitudinal rod 26 with respect to the cross-coupler 28, to thereby stabilize the correction assembly 20 (and the associated vertebrae) in the final position desired by the surgeon. It should be understood that the foregoing steps are specific to the arrangement of the cross-coupler 28 illustrated in FIGS. 2A-2D. Other cross-couplers 28 having different features, but capable of coupling a longitudinal rod 26 to lateral rods 24 generally as shown in FIG. 1, would be suitable for treatment methods described below.

Figure 2E:
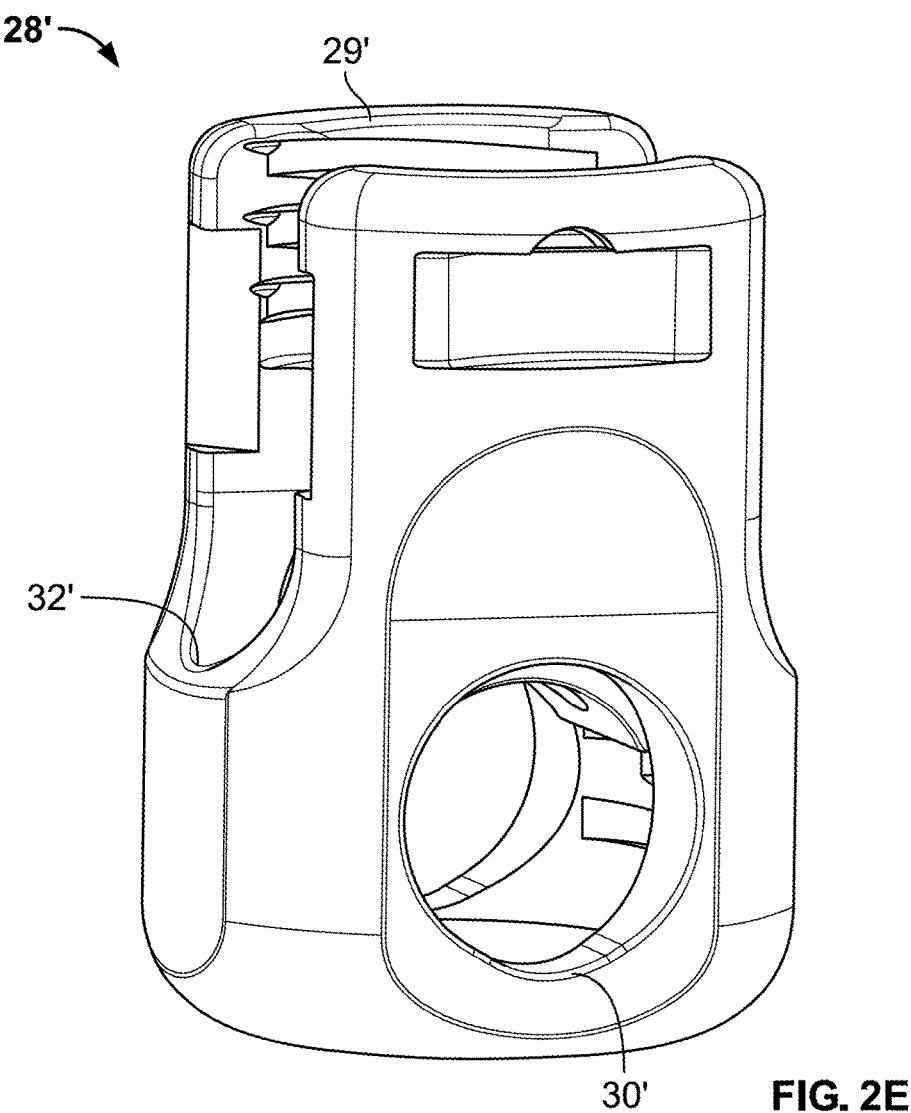
FIG. 2E is a perspective view of an alternative arrangement of the component of FIG. 2B.

A cross-coupler 28' according to an alternative arrangement is illustrated in FIG. 2E. The cross-coupler 28' includes a top opening 29', apertures 30', and slot 32' generally similar to those of the cross-coupler 28 illustrated in FIGS. 2A-2D. The cross-coupler 28' differs in that the apertures 30' are shaped to conform around the lateral rod 24 such that a lower insert 34 is unnecessary. The cross-coupler 28' therefore does not include lower notches 28a.

Figure 3A:
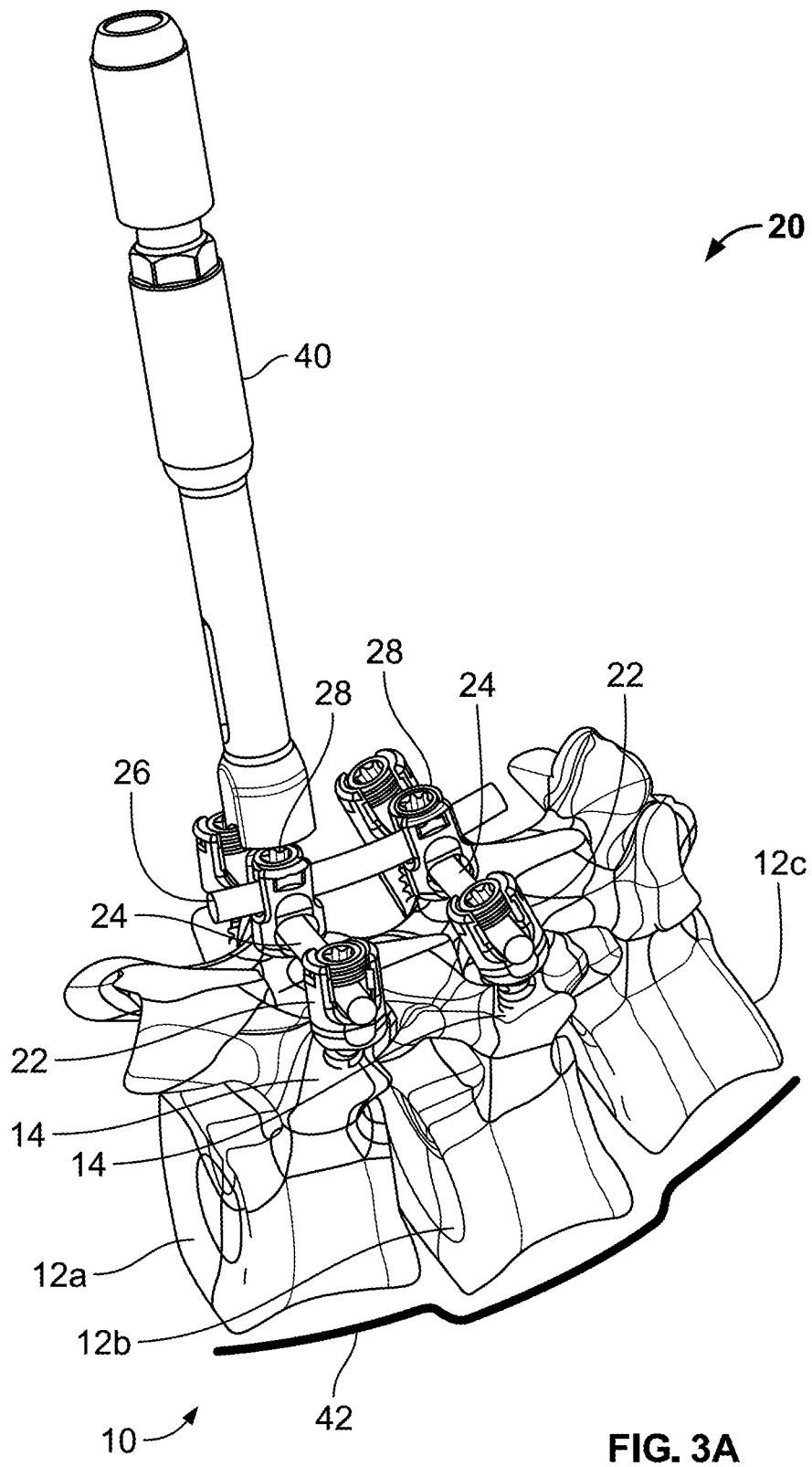
FIGS. 3A and 3B illustrate steps in a spinal correction method using a spinal correction assembly according to a second arrangement.
Figure 3B:
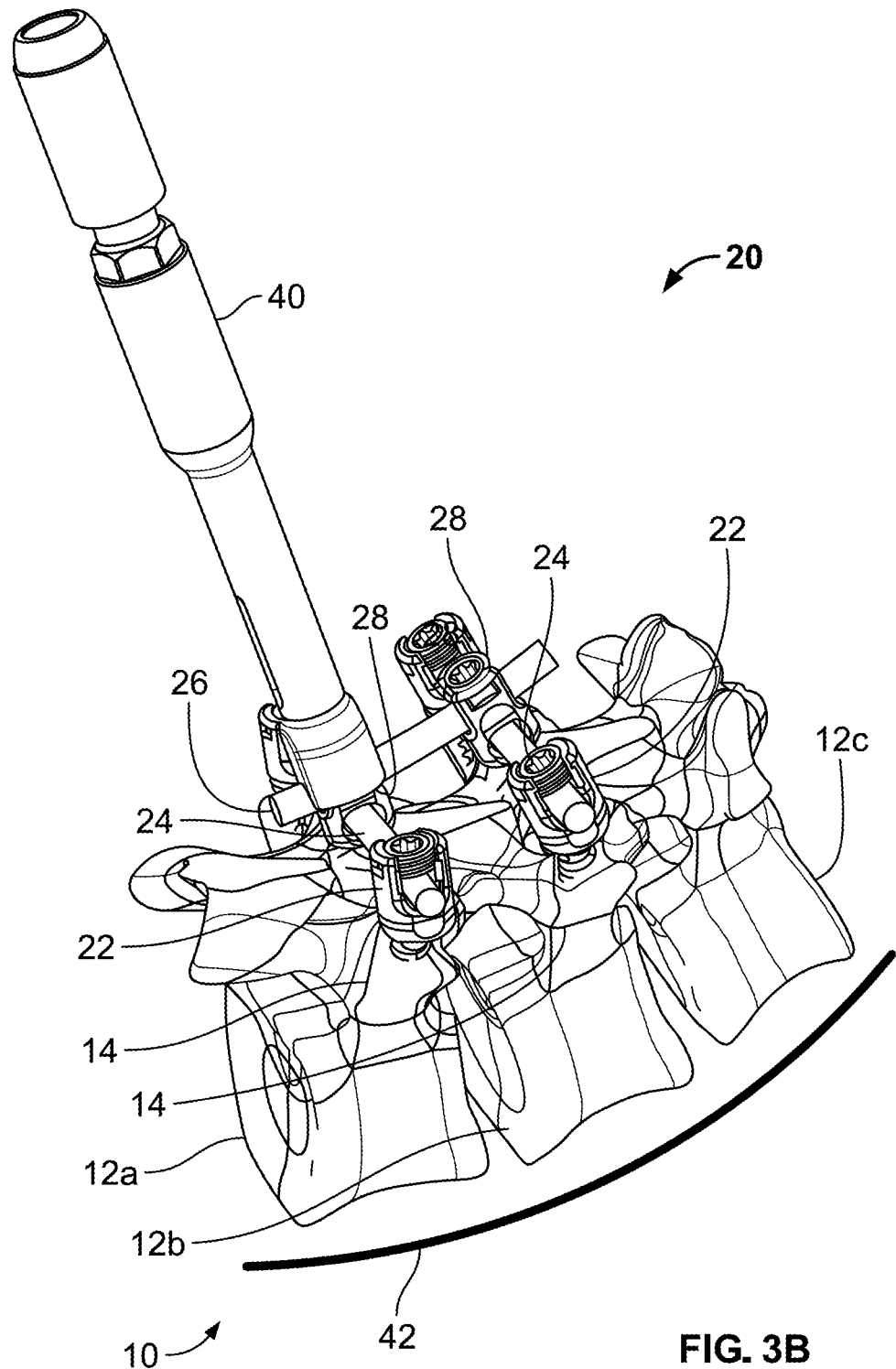

A method of correcting spondylolisthesis with the correction assembly 20 is presented in FIGS. 3A and 3B. In FIG. 3A, a row of vertebrae 12 includes, in order, a first vertebra 12a, second vertebra 12b, and third vertebra 12c. The second vertebra 12b presents a ventral offset spondylolisthesis from the first vertebra 12a and third vertebra 12c, as represented in the jagged contour line 42 running along the vertebrae 12a, 12b, 12c. The correction assembly 20 shown in FIGS. 3A and 3B is connected only to the first vertebra 12a and the second vertebra 12b, enabling the manipulation of the first and second vertebrae 12a, 12b in isolation from the rest of the spine.

To correct the spondylolisthesis, a manipulator 40 is engaged to the cross-coupler 28 fastened to the first vertebra 12a, for example by receiving the cross-coupler 28 in a receptacle (not shown) at the distal end of the manipulator 40, which receptacle is shaped to closely surround the outer profile of the cross-coupler 28. A proximal end of the manipulator 40 may then be pushed longitudinally away from the second vertebra 12b. Turning the manipulator 40 rotates the cross-coupler 28 and the longitudinal rod 26 about the axis of the lateral rod 24 fastened to the first vertebra 12a. Rotating the longitudinal rod 26 counter-clockwise from the perspective of FIGS. 3A and 3B pulls the second vertebra 12b dorsally and into alignment with the first vertebra 12a and third vertebra 12c as represented in the smooth curve of the contour line 42 shown in FIG. 3B. Preferably, during the maneuver, the set screws 38 in the cross-couplers 28 are not fully advanced against the longitudinal rod 26, such that both cross-couplers 28 are permitted to rotate about the respective lateral rods 24. Once the second vertebra 12b is pulled into the desired alignment, however, the set screws 38 in the cross-couplers 28 can be fully tightened to lock the longitudinal positions and the rotational orientations of the lateral rods 24 and the longitudinal rod 26 with respect to the cross-coupler 28, to thereby fix the corrected alignment of the vertebrae.

Figure 4A:
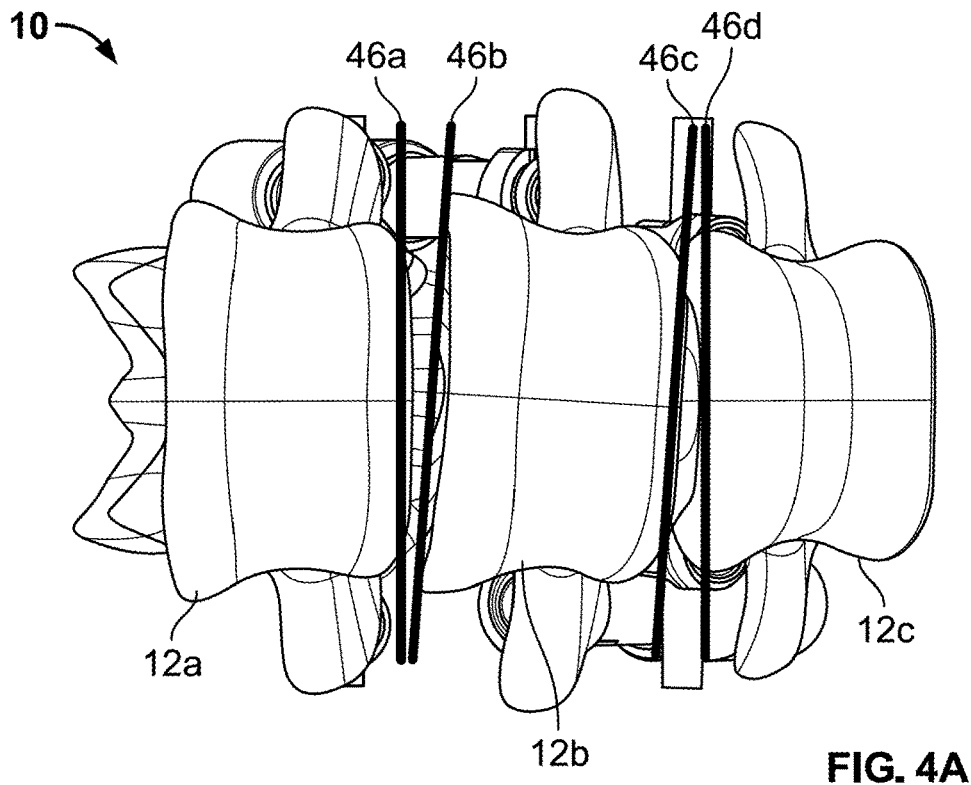
FIGS. 4A-4D illustrate steps in a spinal correction method using a spinal correction assembly according to a third arrangement.
Figure 4B:
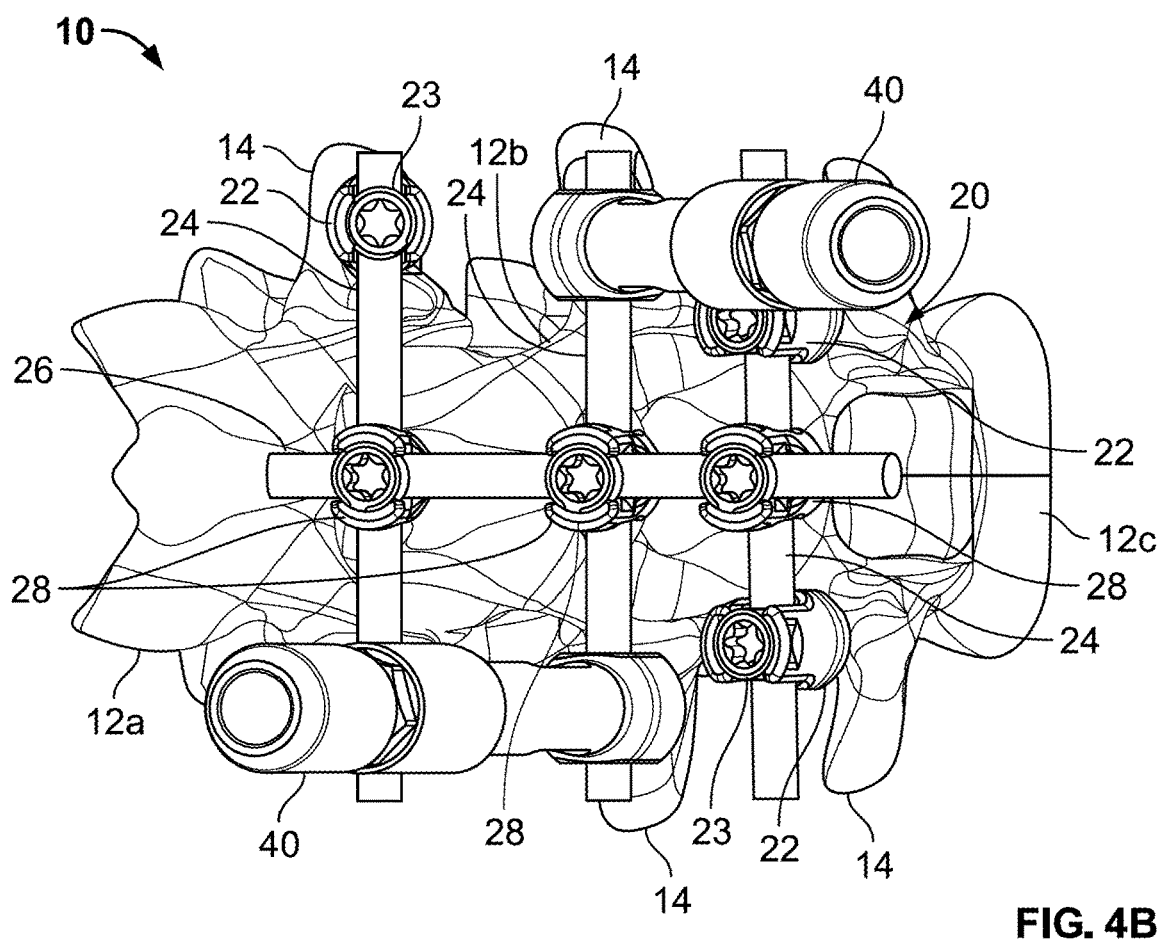
Figure 4C:
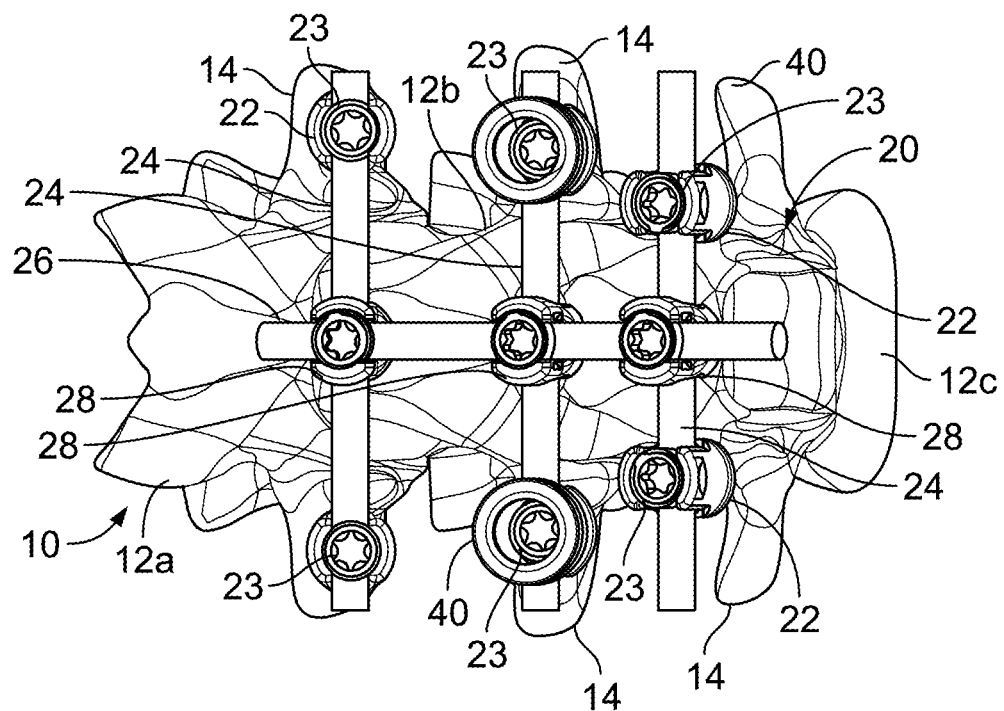
Figure 4D:
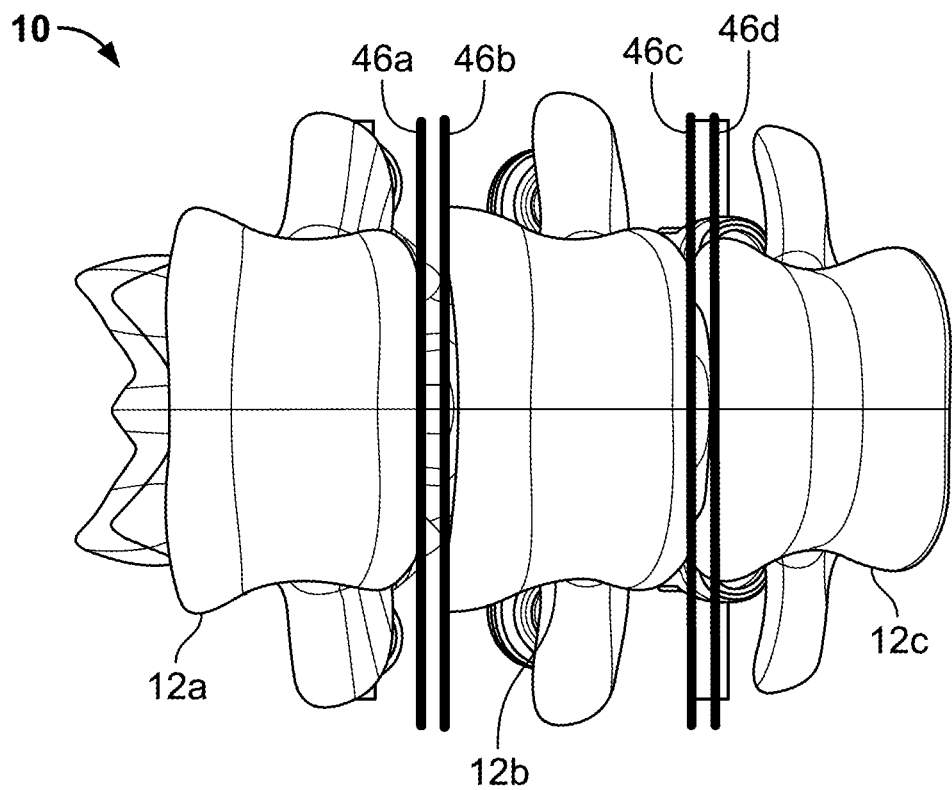

A method of correcting scoliosis with the correction assembly 20 is presented in FIGS. 4A-4D. In FIGS. 4A and 4B, the first, second, and third vertebrae 12a, 12b, 12c present a scoliosis with the second vertebra 12b twisted about the sagittal axis out of alignment with the first vertebra 12a and third vertebra 12c. FIG. 4A shows a first reference plane 46a, second reference plane 46b, third reference plane 46c, and fourth reference plane 46d, representing a superior surface of the body of the first vertebra 12a, an inferior surface of the body of the second vertebra 12b, a superior surface of the body of the second vertebra 12b, and an inferior surface of the body of the third vertebra 12c respectively. Due to the scoliosis presented by the vertebrae 12a, 12b, 12c, the second reference plane 46b and third reference plane 46c are not parallel with the first reference plane 46a or fourth reference plane 46d.

To correct the scoliosis, a manipulator 40 is engaged to the head of each of the two pedicle screws 22 driven into the pedicles 14 of the second vertebra 12b as shown in FIG. 4B. The manipulators 40 are then turned in opposite directions, such as by applying a force in a superior direction to the proximal end of one manipulator 40 and applying a force in an inferior direction to the distal proximal end of the other manipulator 40 as demonstrated by the transition from FIG. 4B to FIG. 4C. Turning the pedicle screws 22 driven into the second vertebra 12b in opposite directions about the lateral rod 24 extending therebetween turns the second vertebra 12b about the sagittal axis. The second vertebra 12b is thereby turned into alignment with the first vertebra 12a and third vertebra 12c as illustrated by the parallel first reference plane 46a, second reference plane 46b, third reference plane 46c, and fourth reference plane 46d shown in FIG. 4D. After the manipulation is performed, the set screws 23 in the pedicle screws 22 on either end of the lateral rod 24 connected to the second vertebra 12b may be tightened to fix the corrected position of the second vertebra 12b.

Figure 5:
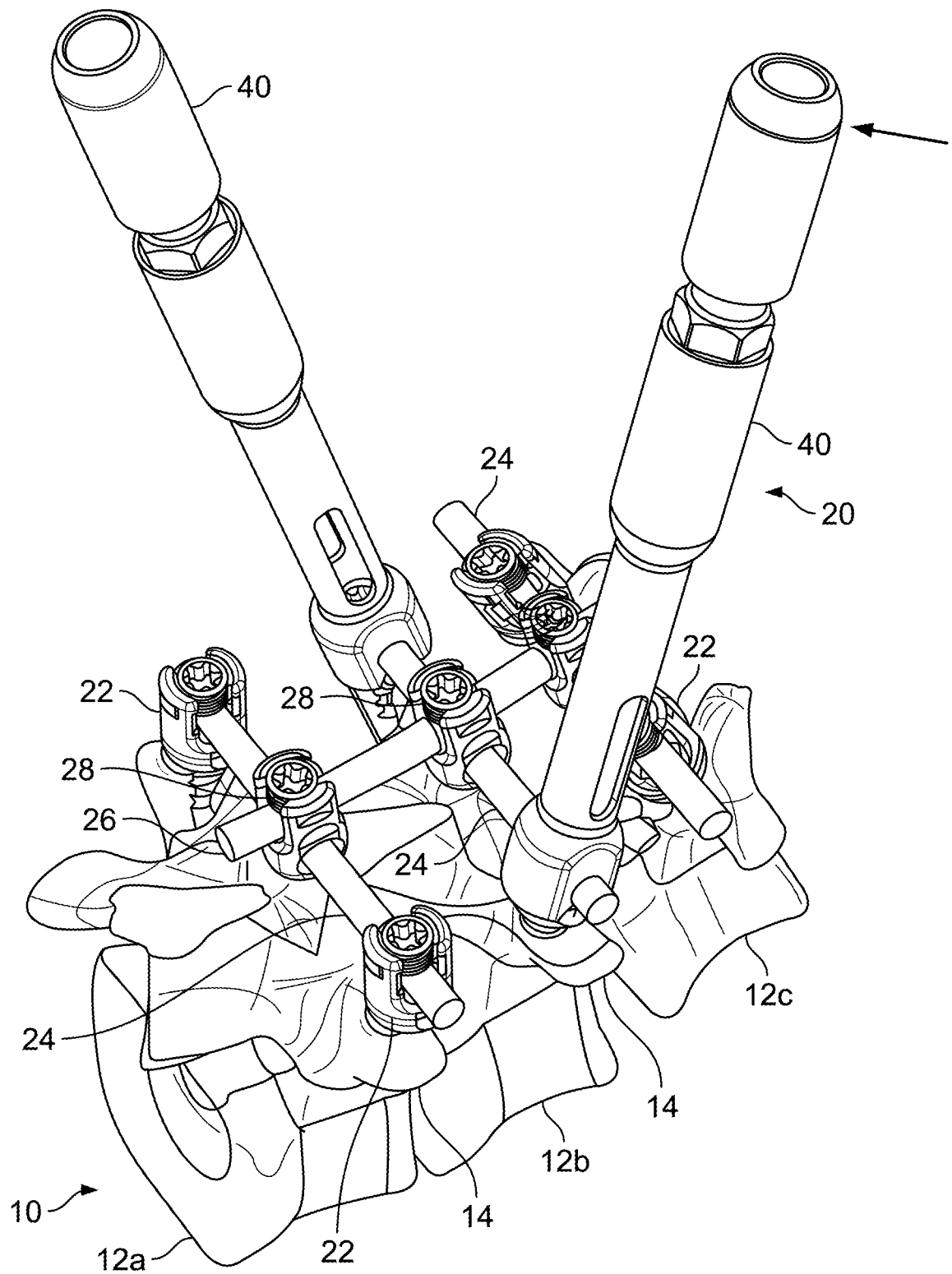
FIG. 5 illustrates an optional step for the method illustrated in FIGS. 4A-4D.

In a similar method illustrated in FIG. 5, scoliosis may be corrected by turning one manipulator 40 while holding the manipulator 40 at the opposite end of the same lateral rod 24 stationary. The amount and direction that either pedicle screw 22 driven into any one vertebra 12 is turned, in absolute terms or relative to the other, depends on the scoliosis presented, and will likely be determined on a case by case basis.

Figure 6:
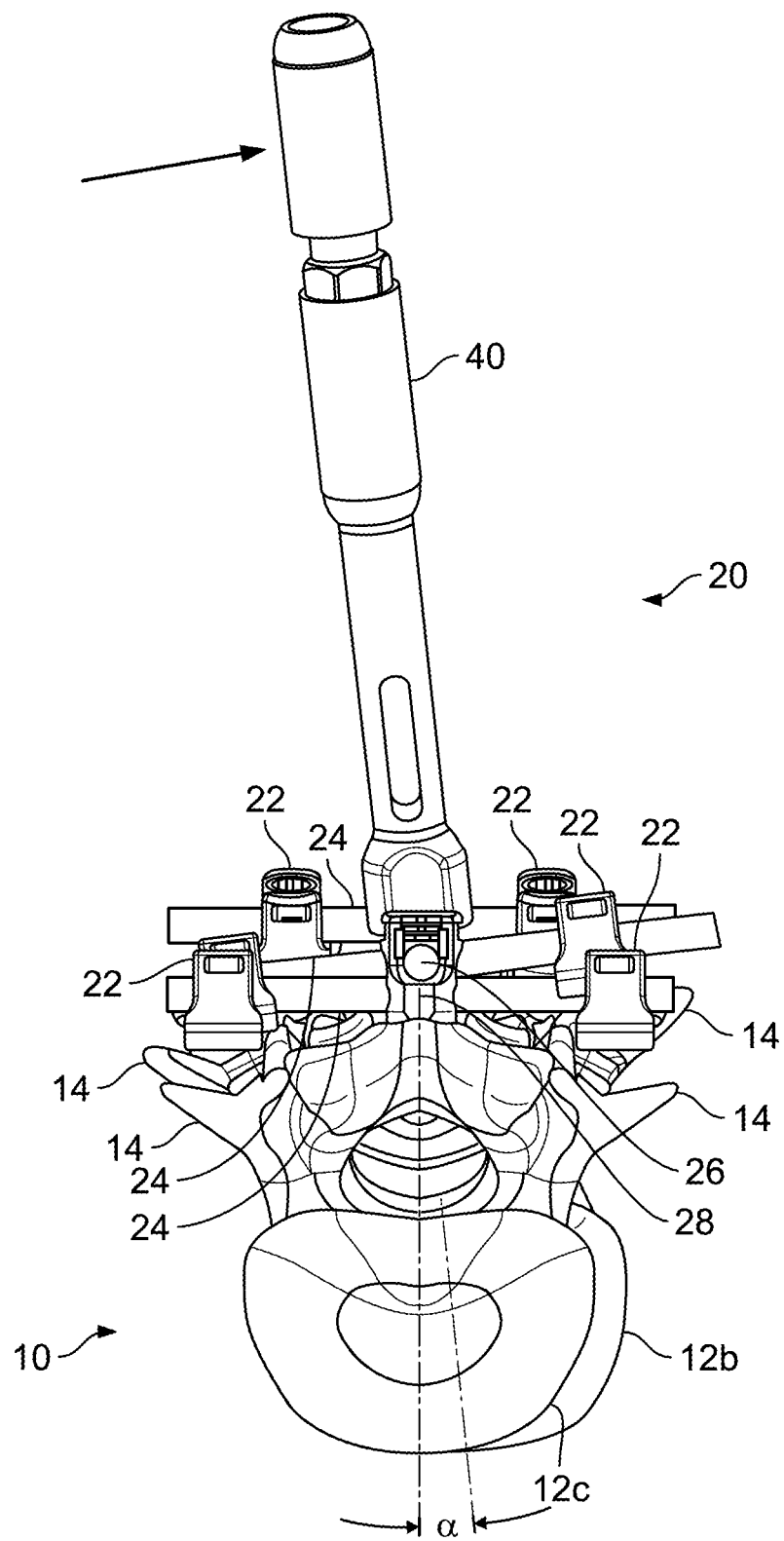
FIG. 6 illustrates a second spinal correction method using the spinal correction assembly of FIGS. 4A-5.

A method that may be used to correct either or both of spondylolisthesis and scoliosis is illustrated in FIG. 6. In the arrangement illustrated in FIG. 6, the correction assembly 20 is fastened to a first vertebra 12a (not visible from the perspective of FIG. 6), second vertebra 12b, and third vertebra 12c generally as shown in FIGS. 3A-5. The second vertebra 12b is misaligned laterally from the first vertebra 12a and third vertebra 12c. The particular misalignment shown in FIG. 6 is as if the second vertebra 12b had been turned about the longitudinal rod 26 by an angle α away from the first vertebra 12a and third vertebra 12c. Such misalignment may result from scoliosis or from a more complex deformity having already been partially corrected by reduction of the longitudinal rod 26 into the cross-couplers 28.

To correct the deformity presented in FIG. 6, a manipulator 40 is engaged to the cross-coupler 28 fastened to the second vertebra 12b. Because the second vertebra 12b is offset from the first vertebra 12a and third vertebra 12c in a counter-clockwise direction about the longitudinal rod 26 from the perspective of FIG. 6, a lateral force is applied to a proximal end of the manipulator 40 to turn the cross-coupler 28, and thereby the lateral rod 24 fastened to the second vertebra 12b and the second vertebra 12b itself, in a clockwise direction about the longitudinal rod 26. Turning the manipulator 40 clockwise across the angle α thus pulls the second vertebra 12b into alignment with the first vertebra 12a and third vertebra 12c. The set screw 38 of the cross-coupler 28 may be loose before the second vertebra 12b is turned into alignment, and then tightened after the second vertebra 12b is turned into alignment.

Figure 7A:
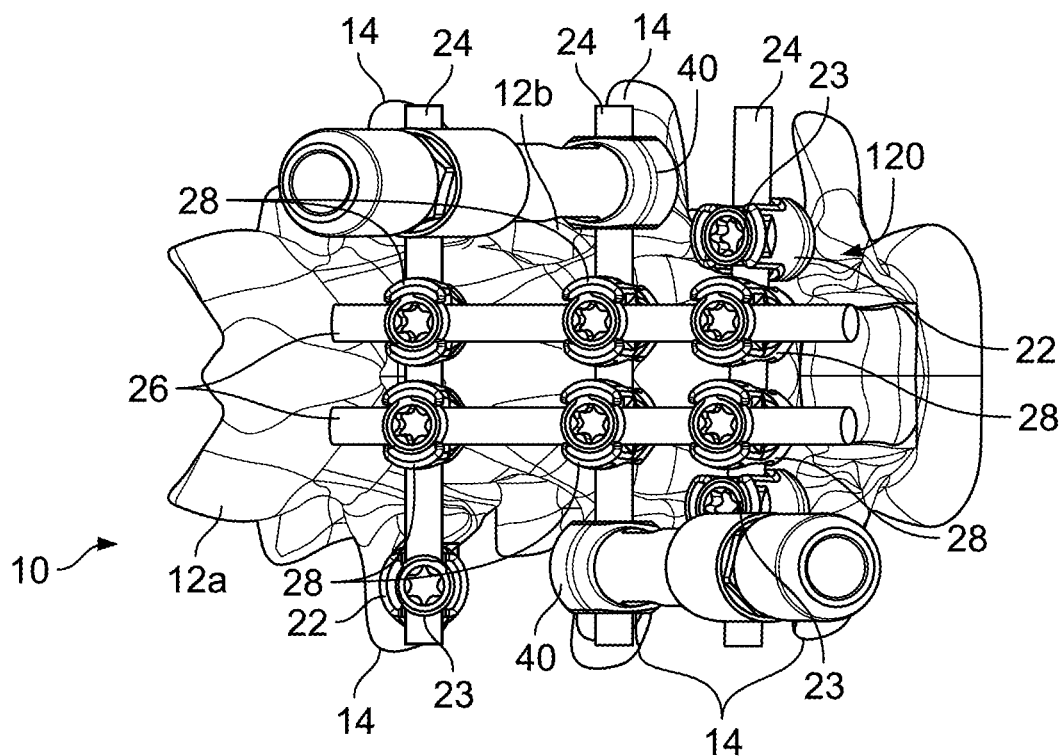
FIGS. 7A and 7B illustrate steps in a spinal correction method using a spinal correction assembly according to a fourth arrangement.
Figure 7B:
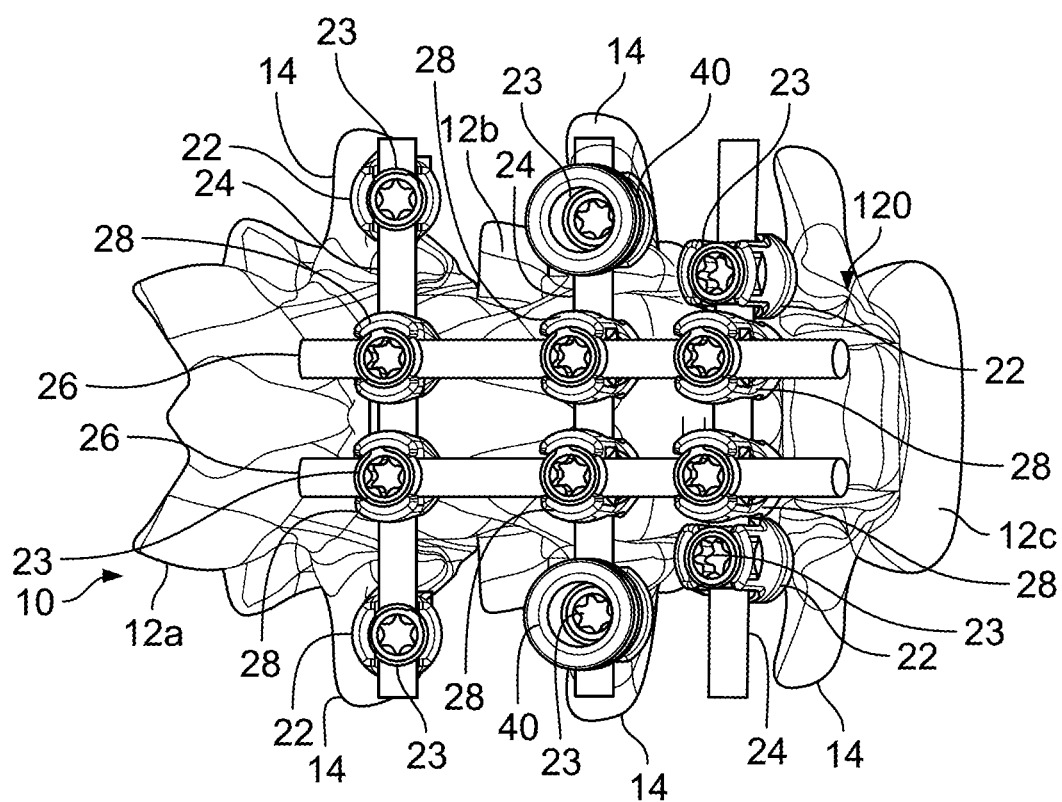

FIGS. 7A and 7B illustrate a method of scoliosis correction similar to that described above with regard to FIGS. 4A-5, performed with a correction assembly 120 according to an alternative arrangement. The correction assembly 120 includes two parallel longitudinal rods 26 running along the spine 10, with two cross-couplers 28 on each lateral rod 24 to connect each lateral rod 24 to both longitudinal rod 26. The correction assembly 120 can be used to correct a misaligned vertebra 12 by rotating one or both of the pedicle screws 22 driven into the misaligned vertebra 12 relative to the other pedicle screw 22 driven into the same vertebra 12. The set screws 23 in the pedicle screws 22 driven into the second vertebra 12b may be loose until the second vertebra 12b is aligned. After the second vertebra 12b is aligned, the set screws 23 in the pedicle screws 22 driven into the second vertebra 12b may be tightened. Similar assemblies and methods may include as many longitudinal rods 26 and cross-couplers 28 per vertebra 12 as suitable for a given application. Additional longitudinal rods 26 provide greater stability with less lateral flexibility, so the number of longitudinal rods may be chosen as appropriate for a given situation. Thus, the assembly 120 may include two or more longitudinal rods and two or more cross-couplers 28 per lateral rod 24.

Figure 8A:
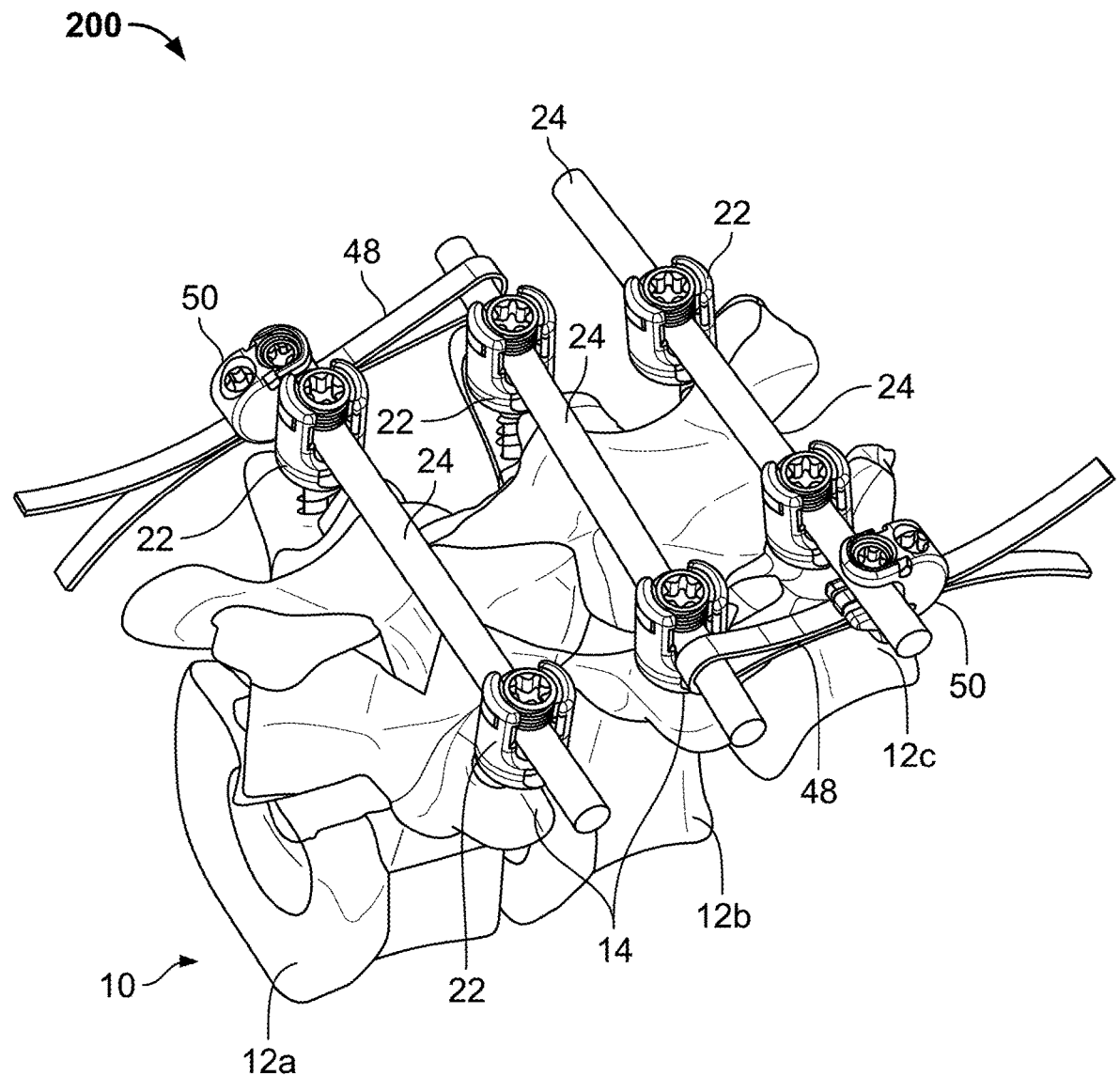
FIGS. 8A and 8B illustrate steps in a spinal correction method using a spinal correction assembly according to a fifth arrangement.
Figure 8B:
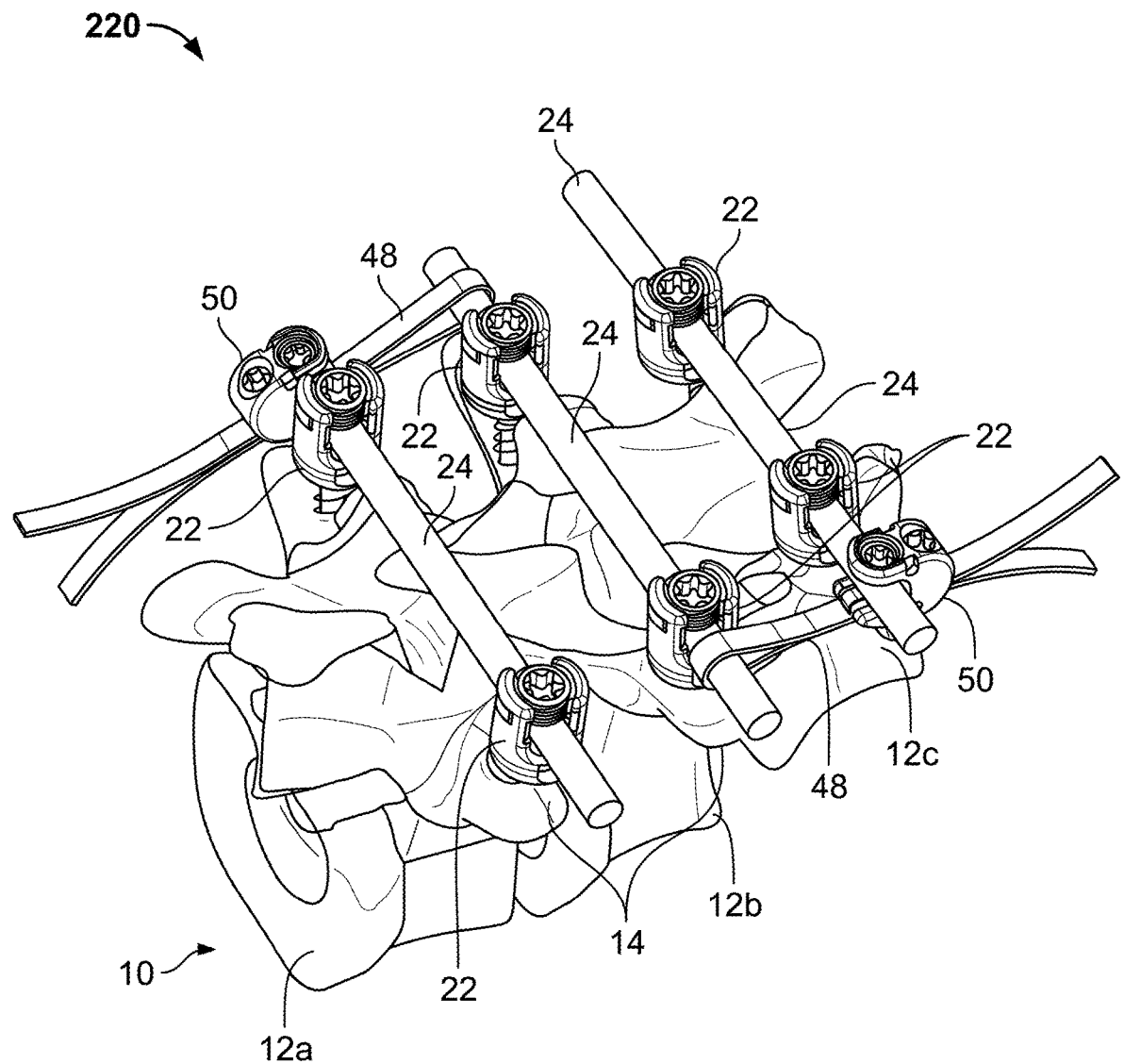

FIGS. 8A and 8B illustrate a method of scoliosis correction performed with a correction assembly 220 according to another alternative arrangement. The correction assembly 220 includes flexible implants such as straps 48 looped over opposite ends of the lateral rod 24 fastened to the second vertebra 12b. One of the straps 48 extends through an implant housing 50 attached to a lateral end of the lateral rod 24 fastened to the first vertebra 12a and the other strap 48 extends through an implant housing 50 attached to a lateral end of the lateral rod 24 fastened to the third vertebra 12c. Tightening either or both of the straps 48 through the respective implant housings 50 thus realigns the second vertebra 12b as illustrated in FIG. 8B. The straps 48 and implant housings 50 may be used before, after, or alongside the correction assemblies 20, 120 of above described arrangements to supplement any of the correction methods described with regard to FIGS. 3A-7B. Set screws internal to the implant housings 50 may be tightened down onto the straps 48 after the second vertebra 12b is pulled into alignment to prevent the flexile implants 48 from loosening. For further details regarding the flexible implants such as straps 48 and implant housing 50, reference may be made to U.S. Pat. No. 9,675,386, filed Mar. 11, 2014, the entire disclosure of which is hereby incorporated by reference. For treatment of large scoliotic curves, multiple straps 48 and implant housings 50 may be placed on portions of the lateral rods 24 extending from a convex side of the curve.

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A method of treating a spinal deformity, the method comprising:
   driving a pedicle screw into each pedicle of at least two adjacent vertebrae;
   retaining lateral rods within retaining features of the pedicle screws, each lateral rod having a cross coupler positioned thereon, such that each lateral rod and cross coupler is fastened to one of the vertebrae by a pair of pedicle screws;
   placing a longitudinal rod through each cross-coupler on each of the lateral rods; and
   after the longitudinal rod is retained within the cross-couplers, rotating either the cross-coupler fastened to a selected vertebra or a first of the pedicle screws driven into the selected vertebra about the lateral rod fastened to the selected vertebra by engaging a distal end of a manipulator to either the cross-coupler fastened to the selected vertebra or a head of the first of the pedicle screws driven into the selected vertebra and applying a force to a proximal end of the manipulator that is transverse to a proximal-distal axis of the manipulator.

2. The method of claim 1, comprising treatment of a sagittal spondylolisthesis by rotating the cross-coupler fastened to the selected vertebra about the lateral rod fastened to the selected vertebra.

3. The method of claim 2, wherein rotating the cross-coupler fastened to the selected vertebra rotates the longitudinal rod, thereby moving another vertebra relative to the selected vertebra in either an anterior or posterior direction.

4. The method of claim 2, wherein a cross-coupler set screw is in a loosened state while the cross-coupler is rotated relative to the lateral rod, the method further including tightening the cross-coupler set screw against the longitudinal rod after the cross-coupler is rotated relative to the lateral rod.

5. The method of claim 1, comprising rotating the first of the pedicle screws driven into the selected vertebra about the lateral rod fastened to the selected vertebra relative to a second of the pedicle screws driven into the selected vertebra.

6. The method of claim 5, wherein a pedicle screw set screw is in a loosened state within the first of the pedicle screws during rotation of the first of the pedicle screws, the method further including tightening the pedicle screw set screw within the first of the pedicle screws against the lateral rod fastened to the selected vertebra after the first of the pedicle screws is rotated about the lateral rod.

7. The method of claim 5, comprising rotating the second of the pedicle screws driven into the selected vertebra in an opposite direction about the lateral rod fastened to the selected vertebra from the first of the pedicle screws driven into the selected vertebra.

8. The method of claim 7, wherein a pedicle screw set screw is in a loosened state within each of the first and second pedicle screws driven into the selected vertebra during rotation of the first and second pedicle screws, the method further including tightening the pedicle screw set screws within the first and second pedicle screws against the lateral rod fastened to the selected vertebra after the first and second pedicle screws are rotated about the lateral rod.

9. The method of claim 1, comprising rotating the cross-coupler fastened to the selected vertebra about the longitudinal rod after the longitudinal rod is retained within the cross-couplers.

10. The method of claim 1, wherein the placing the longitudinal rod includes the longitudinal rod extending through a channel of each cross-coupler on each of the lateral rods.

11. A method of correcting a spinal deformity, the method comprising:
- driving a pedicle screw into each pedicle of at least two adjacent vertebrae;
- retaining lateral rods within retaining features of the pedicle screws, each lateral rod having a cross coupler positioned thereon, such that each lateral rod and cross coupler is fastened to one of the vertebrae by a pair of the pedicle screws;
- placing a longitudinal rod through each cross-coupler on each of the lateral rods; and
- after the longitudinal rod is retained within the cross-couplers, rotating the cross-coupler fastened to a selected vertebra about a longitudinal axis of the longitudinal rod with a manipulator.

* * * * *